US010070201B2

(12) United States Patent
Avison-Fell (10) Patent No.: US 10,070,201 B2
(45) Date of Patent: Sep. 4, 2018

(54) RECOGNITION OF IMAGES WITHIN A VIDEO BASED ON A STORED REPRESENTATION

(75) Inventor: Craig Avison-Fell, Settle (GB)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 136 days.

(21) Appl. No.: 12/977,948

(22) Filed: Dec. 23, 2010

(65) Prior Publication Data

US 2012/0167144 A1 Jun. 28, 2012

(51) Int. Cl.
*H04N 21/234* (2011.01)
*H04N 21/858* (2011.01)
(Continued)

(52) U.S. Cl.
CPC ..... *H04N 21/8586* (2013.01); *H04N 1/00331* (2013.01); *H04N 1/00336* (2013.01);
(Continued)

(58) Field of Classification Search
CPC ....... H04N 21/23418; H04N 21/44008; H04N 21/4725; H04N 21/4728; H04N 21/858;
(Continued)

(56) References Cited

U.S. PATENT DOCUMENTS

2004/0221308 A1\* 11/2004 Cuttner .............. H04N 5/44543
725/46
2005/0018216 A1\* 1/2005 Barsness et al. .............. 358/1.6
(Continued)

FOREIGN PATENT DOCUMENTS

WO 0172040 A2 9/2001
WO WO-0172040 A2 \* 9/2001 ............. H04N 7/165
(Continued)

OTHER PUBLICATIONS

European Patent Office, International Searching Authority, "International Search Report" dated Apr. 5, 2012; International Appln. No. PCT/EP2011/073350, filed Dec. 20, 2011.
(Continued)

*Primary Examiner* — Robert J Hance
(74) *Attorney, Agent, or Firm* — Lorenz & Kopf LLP (57) ABSTRACT

One embodiment described herein may take the form of a system or method for detecting an image within a video component of a multimedia presentation on a distribution system. In general, the system or method may analyze one or more frames of a video component of a presentation to detect the presence of an image within the one or more frames that matches or approximates one or more images stored in a searchable database. Once detected, the system or method may compare one or more features of the potentially matching image with the collection of images. If the potential image matches or approximates an image within the searchable database, the system or method may provide a selectable link within the multimedia presentation that links the detected image with associated information concerning the image. Such information may be presented on a display device to the viewer of the presentation.

20 Claims, 8 Drawing Sheets

(51) Int. Cl.
  *H04N 1/411*     (2006.01)
  *H04N 21/4725*   (2011.01)
  *H04N 1/00*      (2006.01)
  *H04N 21/4728*   (2011.01)
  *H04N 21/433*    (2011.01)
  *H04N 21/44*     (2011.01)
  *H04N 21/4722*   (2011.01)

(52) U.S. Cl.
  CPC ..... *H04N 1/4115* (2013.01); *H04N 21/23418* (2013.01); *H04N 21/4332* (2013.01); *H04N 21/44008* (2013.01); *H04N 21/4722* (2013.01); *H04N 21/4725* (2013.01); *H04N 21/4728* (2013.01); *H04N 21/858* (2013.01); *H04N 21/8583* (2013.01)

(58) Field of Classification Search
  CPC ........... H04N 21/8583; H04N 1/00331; H04N 1/00336; H04N 1/4115
  See application file for complete search history.

(56) References Cited

U.S. PATENT DOCUMENTS

| | | | |
|---|---|---|---|
| 2006/0195858 A1* | 8/2006 | Takahashi et al. | 725/19 |
| 2008/0021710 A1* | 1/2008 | Ho | 704/270.1 |
| 2008/0229363 A1* | 9/2008 | Lanfermann | H04N 7/17318 |
| | | | 725/47 |
| 2009/0064235 A1* | 3/2009 | Sugahara | 725/61 |
| 2009/0113475 A1* | 4/2009 | Li | G06F 17/30817 |
| | | | 725/39 |
| 2009/0119717 A1 | 5/2009 | Newton et al. | |
| 2010/0131847 A1* | 5/2010 | Sievert et al. | 715/719 |
| 2010/0131975 A1* | 5/2010 | Landow et al. | 725/34 |
| 2010/0245681 A1 | 9/2010 | Harris | |
| 2011/0154200 A1* | 6/2011 | Davis | H04N 21/235 |
| | | | 715/716 |
| 2011/0271295 A1* | 11/2011 | Redmann et al. | 725/13 |
| 2011/0286628 A1* | 11/2011 | Goncalves | G06F 17/30256 |
| | | | 382/103 |
| 2012/0023543 A1* | 1/2012 | Shelton et al. | 725/134 |

FOREIGN PATENT DOCUMENTS

| | | |
|---|---|---|
| WO | 2004053732 A2 | 6/2004 |
| WO | 2010117213 A2 | 10/2010 |

OTHER PUBLICATIONS

European Patent Office, Communication pursuant to Article 94(3) EPC in Application No. 11 808 188.4-1871 dated Dec. 15, 2017.

* cited by examiner

RECOGNITION OF IMAGES WITHIN A VIDEO BASED ON A STORED REPRESENTATION

TECHNICAL FIELD

The technical field relates generally to dynamically recognizing an image within a video component of a multimedia presentation of a distribution system based on a stored representation or description of said image.

BACKGROUND

Many multimedia presentations provided through a distribution system include a video component comprising a plurality of frames with one or images presented within each frame. In general, the images presented within any frame of the video may be of interest to a viewer of the video. However, additional information about any of the images contained within the video that may be of further interest to a viewer is often limited to that shown within the video. In this manner, multimedia presentation are often a passive experience for the viewer that is limited to the information provided by the presentation.

BRIEF SUMMARY

One implementation may take the form of a method for detecting an image in one or more frames of a video multimedia presentation. The method may comprise the operations of receiving a first frame from a video component of a multimedia presentation, receiving a first frame from a video component of a multimedia presentation and analyzing the first frame for one or more features of an object. The operations may also include comparing the one or more features to one or more images stored in a database if the one or more features are present in the first frame, providing the first frame to a display device for display and creating a link to access information associated with the object.

Another implementation may take the form of a receiver for a distribution system comprising a microprocessor and a computer-readable storage medium. The computer readable storage medium may store a computer-executable code that, when executed by the microprocessor, causes the receiver to perform several operations. In one embodiment, the receiver may perform the operations of receiving a first frame from a video component of a multimedia presentation, analyzing the first frame for an object within the first frame, wherein the object comprises one or more features that correspond to one or more features of an object stored in an accessible database such that a comparison of the one or more features determines whether the object is located within the first frame and, if the object is not found in the first frame, receiving a second frame from the video component of the multimedia presentation and analyzing the second frame for the object. If the search term is found, then the receiver may perform the operations of determining one or more keywords associated with the object, providing the one or more keywords to a search engine, receiving information associated with the object from the search engine and creating a link to access the information associated with the object.

Yet another implementation may take the form of a method for detecting a web address in one or more frames of a video multimedia presentation. The method may comprise the operations of receiving a first frame of a video and performing an analysis on the first frame to detect the presence of one or more features of an object within the first frame. In addition, the method may include comparing the one or more features to one or more images stored in a database, obtaining a file of information associated with the object if the one or more features approximates one of the one or more stored images, creating a link to the information and providing a query box to a first display device for display, the query box requesting an input from a user to select the link to access the information associated with the object.

DETAILED DESCRIPTION

One embodiment described herein may take the form of a system or method for recognizing an image within a video component of a multimedia presentation on a distribution system or network such as, but not limited to, a satellite, cable or internet network. In general, the system or method may analyze one or more frames of a video component of a multimedia presentation to detect the presence of an image within the one or more frames that matches or approximates one or more images stored in a searchable database. Once detected, the system or method may extract one or more features of the potentially matching image and compare said features with the collection of images. If the potential image matches or approximates an image within the searchable database, the system or method may provide a selectable link within the multimedia presentation that links the detected image with associated information concerning the image. Such information may be presented on a display device to the viewer of the presentation. In another embodiment, the system or method may provide a listing of other multimedia presentations that include the same or a similar image.

Figure 1:
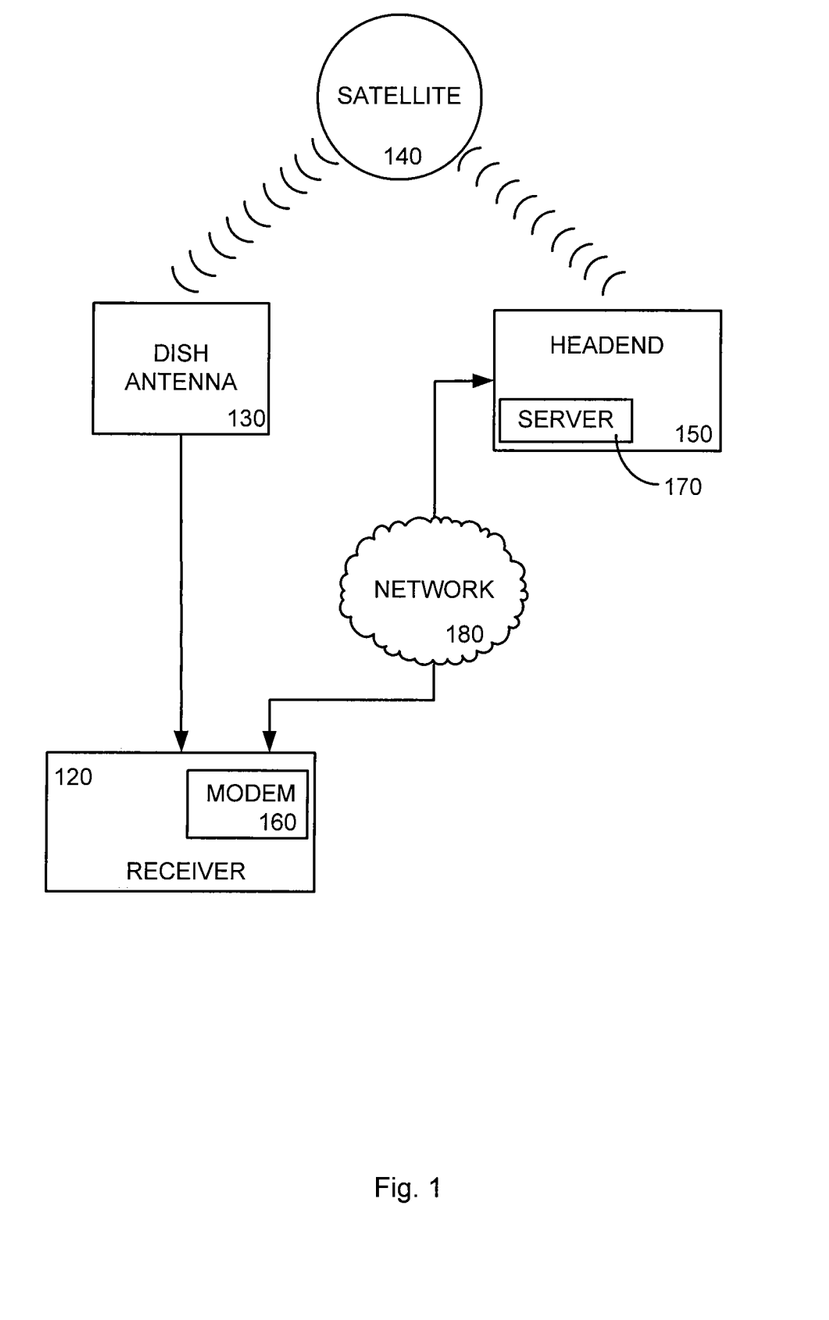
FIG. 1 depicts an exemplary satellite distribution system that may utilize a first embodiment to dynamically recognize web addresses within a video multimedia presentation.

FIG. 1 depicts an exemplary satellite distribution system that may utilize a first embodiment of the present disclosure to recognize an image within a video component of a multimedia presentation based on a stored representation or description of said image. The satellite system of FIG. 1 is but one example of a system that may recognize an image within a video multimedia presentation. Alternatively, a digital cable system or any other system may also utilize the embodiments described herein. Further, it should be appreciated that the system may include more or fewer components than described herein and such components may be interconnected in any manner. Additionally any type of signal may be communicated by the system, such as a video signal, an audio signal, an interactive signal, other signal types and any of various combinations and/or permutations of the foregoing. In general, any distribution system that provides multimedia presentations to a user for viewing may utilize the embodiments described herein.

The system of FIG. 1 may include at least one receiver 120 configured to provide a user with an interface to the system. In general, the receiver 120 of the system may receive an encrypted signal and convert it into a signal that a display or other compatible device may recognize and manipulate in order to present the multimedia presentation to one or more users. Further, the receiver 120 may provide the converted signal to a display device, such as a television or computer screen, for display to the user. In one implementation, the receiver 120 may receive the encrypted signal from a satellite 140 or through a digital cable or network connection. Further, in the satellite and digital cable configurations, the encrypted signal may be generated by a headed 150 and transmitted to the receiver 120. Generally, the head-end 150 may be a master facility that receives programming signals for processing and distribution to various systems. In a satellite television provider, the head-end 150 may transmit the audio/visual signal to a satellite 140 for redistribution to end users, for example, subscribers to a satellite or cable television distribution system. Upon receipt, the satellite 140 may transmit the signal to an dish antenna 130 connected to the receiver 120 for decryption.

In a cable system configuration, the head-end 150 may transmit the multimedia signal directly to the receiver 120 over a cable network connection. For example, the signal may be provided to the receiver 120 through a cable connected, directly or indirectly, between the receiver 120 and the head-end 150. Alternatively, the signal may be provided over a network 180 connection, utilizing for example a modem 160 associated with the receiver 120.

Additionally, the head-end 150 may utilize the network 180 to provide other communication signals to the receiver 120. For example, the head-end 150 may utilize the network 180, the satellite 140 or other telecommunications connections to provide programming updates to the receiver 120. Similarly, the receiver 120 may communicate information to the head-end 150 or to other networked devices, for example, an instruction and information used to store information at the head-end, within the network 180 or otherwise. In one implementation, the network 180 may be the internet such that the signals transmitted over the network may include an internet protocol (IP) address and may take the form of standardized packets of information for proper routing. In addition, the network may include and/or utilize various communication and networking topologies such as wireless, for example, WiFi, Bluetooth, WiMax, 3G, 4G and the like, and/or wired, such as POTS, LAN, WLAN, and the like, and/or any other known or hereinafter developed method to connect to the internet.

In one embodiment, the receiver 120 may be a set-top box ("STB") for a satellite distribution system. However, although the terms "receiver" and "satellite system," or variants thereof, are used throughout this document, it should be understood that other hardware and/or networks may be used for example, one embodiment may employ a cable box and a cable network. Accordingly, the term "receiver" is intended to encompass other similar hardware, just as networks other than satellite systems are embraced by that term or the words "distribution network."

Figure 2:
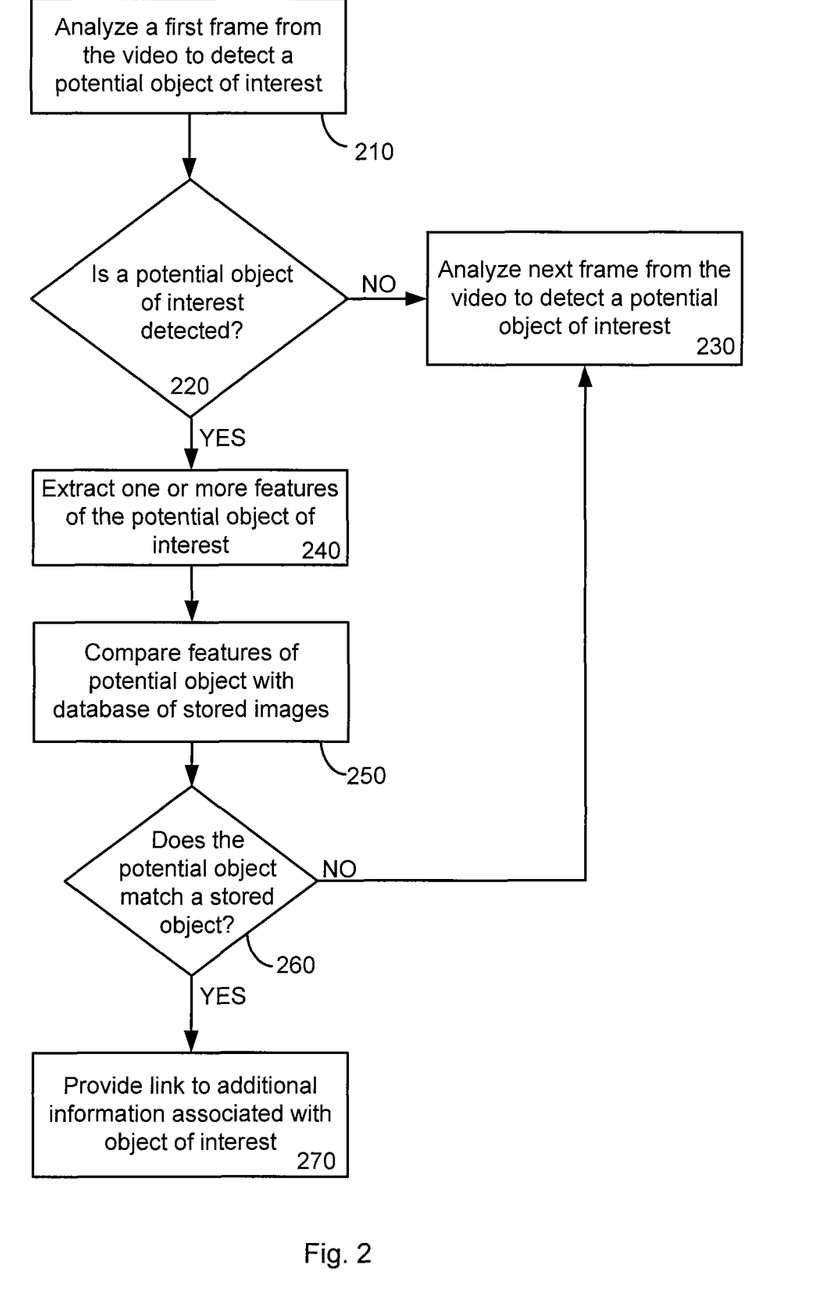
FIG. 2 is a flowchart depicting a method for a receiver to recognize an image within a video component of a multimedia presentation and provide a link to access additional information associated with the image.

FIG. 2 is a flowchart depicting a method for a receiver to recognize an image within a video component of a multimedia presentation and to provide a link to a user to access additional information or other multimedia presentations related to detected image. In one embodiment, the method may be performed by a set-top box of a satellite distribution system such that the detected image may be included in a video stream of a multimedia presentation provided by the satellite distribution system and displayed on the user's display device. Upon detection, the receiver may create a link on the user's display device that may be selected by the user to access additional information associated with the detected image or access additional programs that may also contain the detected image. In one embodiment, the additional information may be displayed on the user's display device along with or in place of the multimedia presentation.

Beginning in operation 210, the receiver may analyze an incoming multimedia presentation stream for an image contained within a video component of the presentation. More particularly, the receiver may extract a frame from the video stream of the presentation, such as after the frame has been decoded and rendered. Once rendered, the receiver may scan the frame for an image that matches or approximates a related image stored in a searchable database. More particularly and described in more detail below, the receiver may extract one or more features of an image within the video frame and compare those features to stored features within a database to determine if the potentially matching image is contained within the frame of the video component of the presentation.

Figure 3:
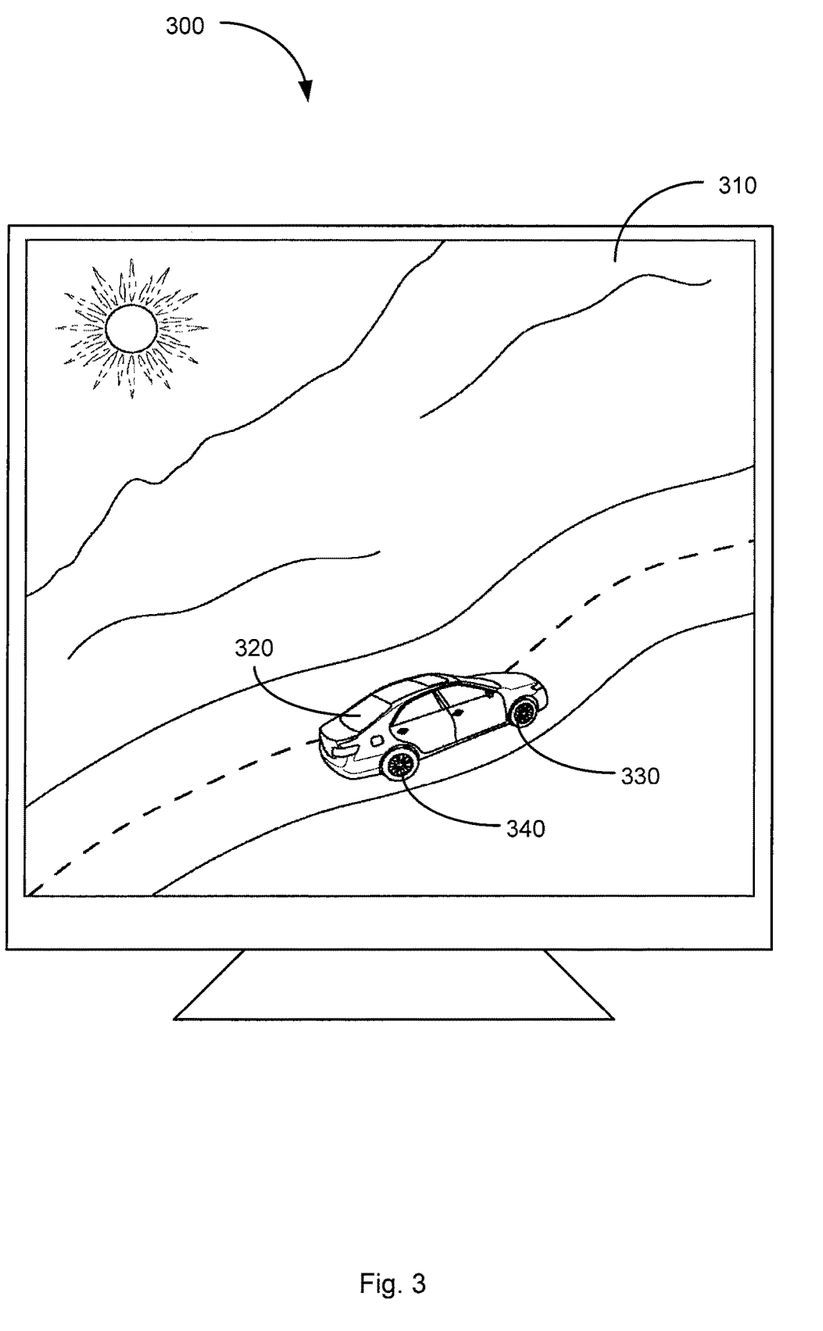
FIG. 3 is a diagram of a display device illustrating a video component of a multimedia presentation including an image within the video that may be recognized by a receiver of a distribution system to provide a viewer of the image information associated with the image.

For example, FIG. 3 is a diagram of a display device 300 illustrating a frame 310 of a video presentation including one or more images 320 that may be recognized and highlighted by the methods and systems of the present disclosure. In particular, the frame 310 illustrated in FIG. 3 displays a car traveling along a road. This frame 310 may be part of a television program, a film, an advertisement or any similar video presentation being displayed on the display device 300. Further, the frame 310 may include any type of object 320. The car scene depicted in FIG. 3 is merely an example of a frame 310 of a video component of a multimedia presentation displayed on the display device 300.

In general, any frame of the video component of the presentation may be analyzed to detect an object within the frame in operation 210. Further, such analysis may occur on a frame once the video frame is decoded and/or rendered. For example, the video component may be received by the receiver in an encoded fashion. The receiver may decode the video and render the information defining the video to create the frames that are displayed on the user's display device. Object detection analysis of these frames may occur once the frames are rendered. In one example, the decoded and rendered frames of the video component may be stored in a memory device associated with the receiver. In this example, object detection analysis of the frames may occur while the frames are stored in the memory device, prior to being displayed on the user's display device. In another embodiment, the object detection analysis of the frame may occur while the frame is being rendered on the user's display device. In such embodiments, however, the frame may sufficiently render the object that is detected on the display device prior to detection of the object.

In operation 220, the receiver may determine whether a the frame of the video (such as frame 310 shown in FIG. 3) includes an object that may be of identified by the system and/or method of the present disclosure. In general, the receiver may detect a potential object of interest by analyzing the frame 310 for certain markers or features of objects 320 within the frame. For example, the receiver may analyze the frame 310 of FIG. 3 to detect the front tire 330 and rear tire 340 of the car object 320 within the frame. More particularly, the receiver may be configured to scan the frame 310 for any number of features 330,340 that may correspond to an object of interest. For example, the receiver may be configured to detect the presence of the shape of a football within the frame, a particular brand name of a certain product, the outline of a particular building, features of an animal, and so on. In general, the receiver may be configured to detect any feature of any object that may be part of one or more frames 310 of a video component of a multimedia presentation.

The features of a potential object may be detected in several ways known to one of ordinary skill in the art. In one embodiment, the receiver may perform an analysis on the frame to determine a plurality of edges within the frame to detect a particular shape of an object. In general, edge detection may be accomplished by analyzing the pixels within the frame to detect abrupt color change from one or more pixels to a nearby group of one or more pixels. Through this analysis, the receiver may determine the edges of one or more objects within the frame, thereby detecting a general shape of an object within the frame. Further, as described in more detail below, this general shape may be compared with one or more stored shapes to determine an object displayed within the frame.

In another embodiment, the receiver may analyze several frames of the video to detect motion of an object across the display. In this embodiment, one or more points of the object may be detected by the receiver within several frames of the video. For example, the receiver may detect one or more joints of an animal by analyzing the movements of the animal through several frames of the video. Thus, as the detected points move across the screen, the receiver may maintain information concerning the movement of the points. Further, the movement of the points may provide information to the receiver on the type of that is moving through the several frames. This information may be compared with one or more stored images to determine the presence of the image in the frame. In one example, the detected points may correlate to similar points within the stored object, indicating the presence of the object within the video frames.

In yet another embodiment, the database of objects may store three-dimensional (3-D) models of the objects of interest such that the receiver may detect the object regardless of the orientation of the object within the frame. In one embodiment, the stored 3-D model may include a fully rendered 3-D computer model. In other embodiments, the 3-D model may contain any number of 2-D images of the object at different angles. For example, the receiver may store an image of the object rotated 90 degrees to the right, 45 degrees to the right, perpendicular to the virtual camera, 45 degrees rotated to the left, etc. During detection, the receiver may first determine an orientation of a potential object through an analysis of the frame (such as by doing an edge analysis to determine the orientation of a street). Once the potential orientation, or an approximation thereof, is obtained, the receiver may then compare the stored three-dimensional model corresponding to the potential orientation of the object to determine if the object is found within the frame. In another example, the objects within the frame may be compared to each of the stored rotated images to determine the presence of the object in the frame. In general, however, any method known to one of ordinary skill or in the art or hereafter developed to determine the presence of an object within a frame may be utilized in the present disclosure.

In general, the features that the receiver is configured to detect may be associated with one or more objects that may be of potential interest to a viewer of the video frame. Using the example shown in FIG. 3, the viewer of the video frame 310 may be interested in the car 320 and may wish to learn more information about the car. To determine which features to analyze the frame for, the receiver may maintain a group of such features that correlate to one or more objects stored in a database of potentially interesting objects. For example, if an elephant object is stored in the database, the receiver may be configured to search the frame for an elephant's trunk or tusk. Thus, for each object maintained in the database, one or more correlating features may be searched for in the video frame. Creating and maintaining the database of potential objects is described in more detail below.

If the receiver determines in operation 220 that the frame does not include a feature of a potential object of interest, then the receiver may access a subsequent frame of the video component and perform a similar analysis of the subsequent frame to detect the presence of such a feature. In one example, the additional frame may be the next rendered frame in the video component of the multimedia presentation. However, because video is typically displayed at several frames per second, the receiver may bypass several frames in between accessing frames and analyzing them for an object of interest. In addition, the number of frames that are displayed between the analyzed frames may be at least partially based on the speed in which the receiver may perform the analysis on the frames for the objects. In general, however, once the receiver determines that an potential object is not present in a frame of the video component, any subsequent of the video component may be selected and analyzed to detect a object within the additional frame in operation 230.

In addition, the analysis of the frames of the video component may be limited to specific video streams within the presentation or specific times within the video stream. For example, in the embodiment where the object detection analysis is performed on a television presentation, the receiver may perform the analysis only when a particular program airs that may contain an object of interest. For example, only objects that represent animals may be stored in the database of the receiver. Thus, in this example, the receiver may be configured to consult an electronic program guide (EPG) that may contain information about the programs, such as one or more keywords describing the content of the program. When the program airs on the distribution system, the receiver may access the information of the EPG to determine when a viewer is viewing a program likely to contain animals, such as a nature show. Thus, when the EPG contains a keyword or other indicator that indicates a stored object may be present in the video, the receiver may then begin continually analyzing the frames of the video to search for an object within the frame. Further, when the viewer changes the channel, the receiver may return to a default setting where the object is not present. In general, the receiver may limit the times and video streams on which object search is conducted in any manner to preserve the processing power of the receiver during use.

If the receiver determines that features of a potential object of interest are present in the frame of the multimedia presentation in operation 220, then the receiver may extract or copy those features in operation 240 and compare the features with the objects stored in the database in operation 250. In general, the receiver may compare the features of the object to similar features of the stored objects in the database to find a correlation, or an approximate correlation between the features. If such a correlation or approximate correlation is found, then the video frame may include an object of interest to a viewer of the frame.

In operation 260, the receiver may determine if the detected potential object of interest matches an object stored in the database based on the comparison performed in operation 250. If not, the receiver may discard the detected features and continue on to operation 230 to analyze a subsequent video frame. However, if the detected features are verified in operation 260, then the receiver may provide a link to additional information associated with the object of interest on the user's display device in operation 270. In general, the link may be selected by the user to access the additional information associated with the detected object.

Figure 4:
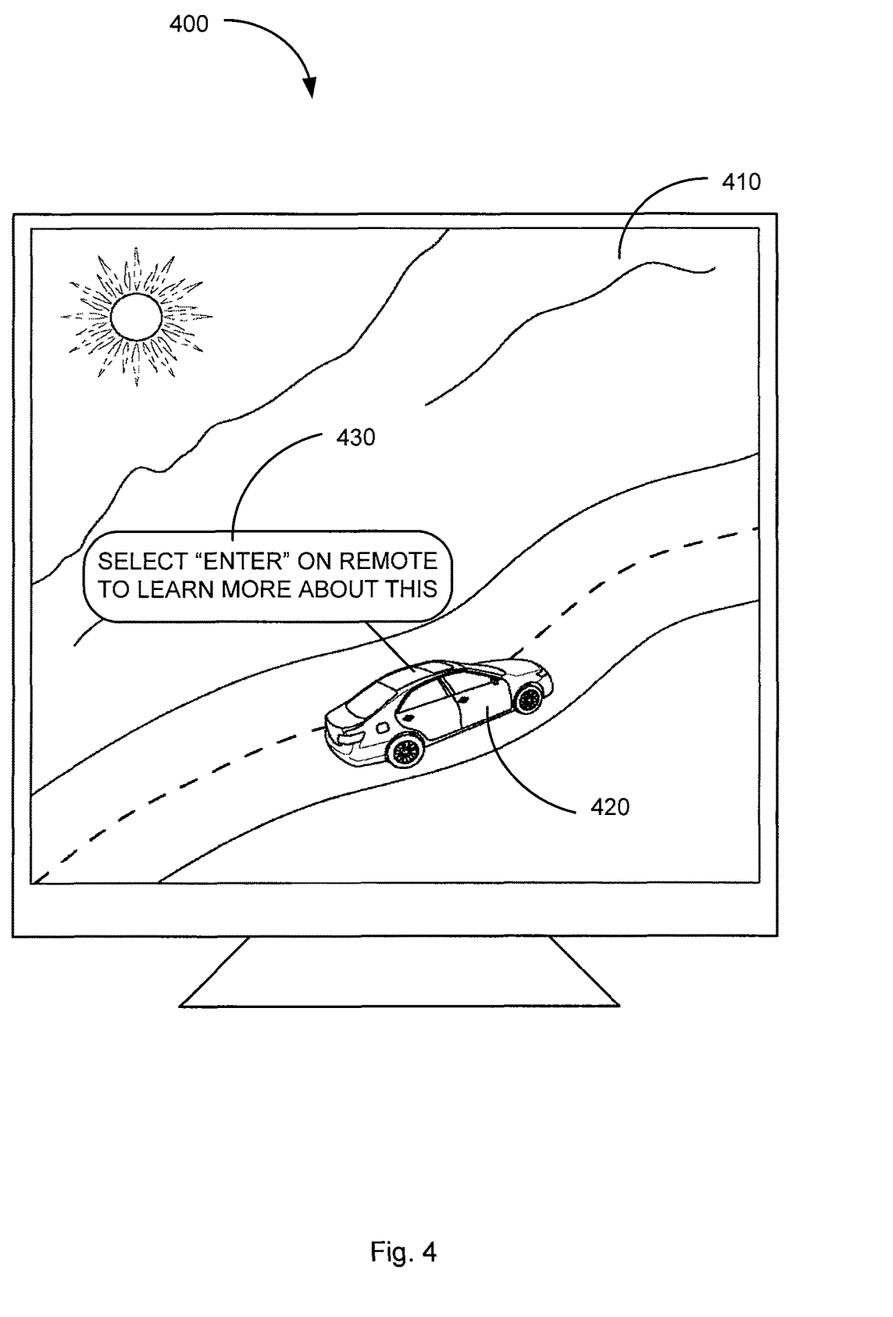
FIG. 4 is a diagram of a display device illustrating a video component of a multimedia presentation including a query box shown on a display device directed at a user to instruct the user on receiving additional information about a detected image.

To provide a link to additional information to the user, the receiver may highlight or otherwise indicate the detected object and query the user for an input. For example, FIG. 4 is a diagram of a display device illustrating a video component of a multimedia presentation including a query box shown on a display device directed at a user to instruct the user on receiving additional information about a detected image. In the embodiment shown, the receiver may insert a query box 430 within the video frame that instructs the user to utilize an input device to the receiver or display device 400 to indicate that more information is desired about the detected object. Thus, as shown, the video frame 410 may include a query box 430 that instructs the user to press "ENTER" on the user's remote control to access additional information associated with the detected object 420. In general, the receiver may query for any type of input from the user to access the created link to additional information. In addition, such a query box 430 is not required in some embodiments. Rather, the user may be previously aware of the input required to access the detected object 420 and may provide such input without a prompt from the receiver, perhaps in response to the object being highlighted or otherwise indicated on the user's display device 400.

Upon selection of the link by the user, the receiver may be provided more information associated with the detected object in several manners. In one embodiment, the receiver may associate the detected object with a keyword. For example, if the detected object is an elephant, the receiver may associate the word "elephant" with the object in the stored database. Thus, when the receiver detects an elephant image within the frame of the video component that approximates an elephant image stored in the database, the receiver may further associate the keyword "elephant" to the detected object. In general, any keyword or group of keywords, either specific or general, may be associated with any object stored in the reference database. For example, rather than the keyword "elephant", the receiver may associate the keyword "African Elephant" or simply "mammal" with the stored image.

Once the receiver determines the keyword associated with the detected object, information about the detected object may be obtained from several sources. In one embodiment, the receiver may provide the keyword or phrase to an internet search engine to retrieve an informational webpage about the detected image. For example, the receiver may detect a particular car within the frame, associate the car with a keyword or phrase and retrieve a webpage containing more information about the car from the internet. The webpage may be an informational webpage, or may be a webpage maintained by the manufacturer of the car that contains price information and purchasing options. In a similar embodiment, the receiver may simply provide the detected object to an image search engine on the internet. Thus, rather than associating a keyword with the object, the receiver may simply provide the object to the image search engine to retrieve the informational webpage.

In another embodiment, the receiver may store the additional information in a computer-readable medium within or otherwise associated with the receiver. Thus, for each image stored in the database, the receiver may also store one or more sources of information for each object. For example, the receiver may store a webpage about each object, a video discussing the detected object, purchasing information for each object, a video-based game associated with the object, and so on. In general, the receiver may store any type of multimedia presentation for one or more objects in the database that contain additional information about the objects. Further, the receiver may store information on some objects in the database, while receiving information for other objects in the database from an outside source. For example, the receiver may store object information on a dedicated network that may be accessed upon detection of one of the objects on the display device.

In yet another embodiment, the information provided on the display device may contain one or more listings of additional multimedia presentations that correlate to the detected object. For example, in the example where the detected object is an elephant, the receiver may determine one or more other programs that may include an elephant, such as a nature program or a program including a circus. To determine one or more other programs that may include the detected object, the receiver may access an EPG that contains information about multimedia programs available on the distribution system. Such information may include a title, a summary of the presentations contents, times that the program is available and so on. In general, the receiver may compare a keyword associated with the detected object to the information contained in the EPG for the distribution system to find the one or more presentations that may include the detected object. Further, such a search may be configurable to limit the comparison of the keyword to just the summary for each program, to a particular channel or channels, or to every entry in the EPG.

Figure 5:
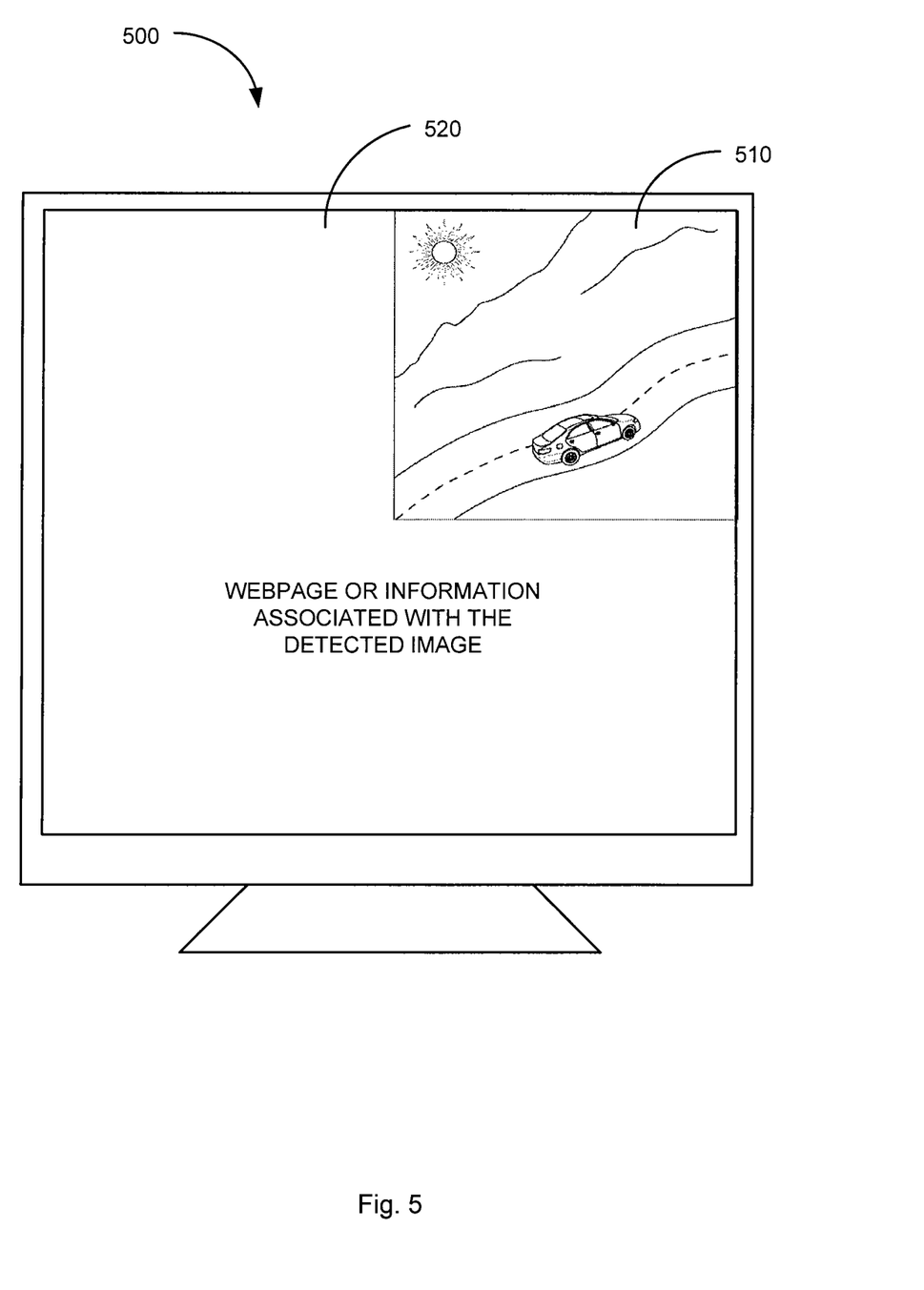
FIG. 5 is a diagram of a display device illustrating a video component of a multimedia presentation and a selected web page/program guide displayed simultaneously on the display device.

Once the information associated with the detected object is retrieved (from the internet, stored database, EPG or other source), the receiver may display the information on the display device. In one embodiment, such as shown in FIG. 5, the information 520 may be provided on the same display device 500 through which the link was selected. In the example shown, the video component 510 of the multimedia presentation may be located within a smaller window on the user's display device 500 while the information associated with the detected object may comprise the rest of the display space of the display device. In other embodiments, the information may comprise the entire display space such that the video component is no longer displayed. In yet another embodiment, the information may be launched within an interactive television feature of the receiver and displayed on the user's display device 600. In still another embodiment, the receiver may provide the information on a separate display device that is not displaying the video component of the multimedia presentation but is otherwise associated with the receiver. For example, the separate display device may be any type of computing device that is capable of displaying a multimedia presentation, such as a desktop computer, handheld computing device, personal digital assistant, mobile telephone, music or audio player (such as an MP3 player) and so on.

Figure 6:
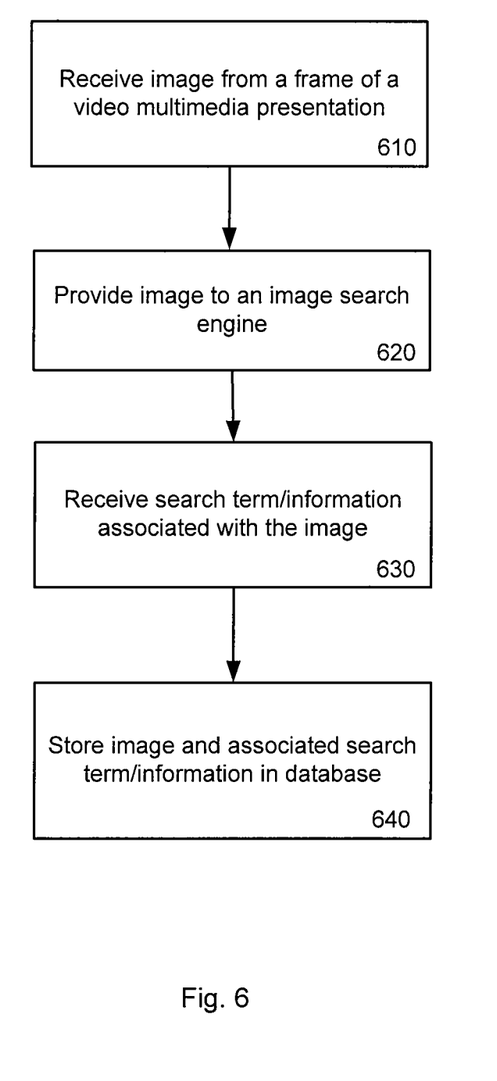
FIG. 6 is a flowchart depicting a method for a receiver to receive an image from a frame of a video component of a multimedia presentation and store said image in a searchable database.

FIG. 6 is a flowchart depicting one method for a receiver to receive an image from a frame of a video component of a multimedia presentation and store said image in a searchable database. The method of FIG. 6 is but one way in which the database of objects of interest may be accumulated, namely by receiving updates to the database by extracting images from a frame of the video component of the multimedia presentation. In another embodiment, the database may be updated by the receiver through the distribution system by receiving an update file through the distribution system and storing the update file in the database.

Figure 7:
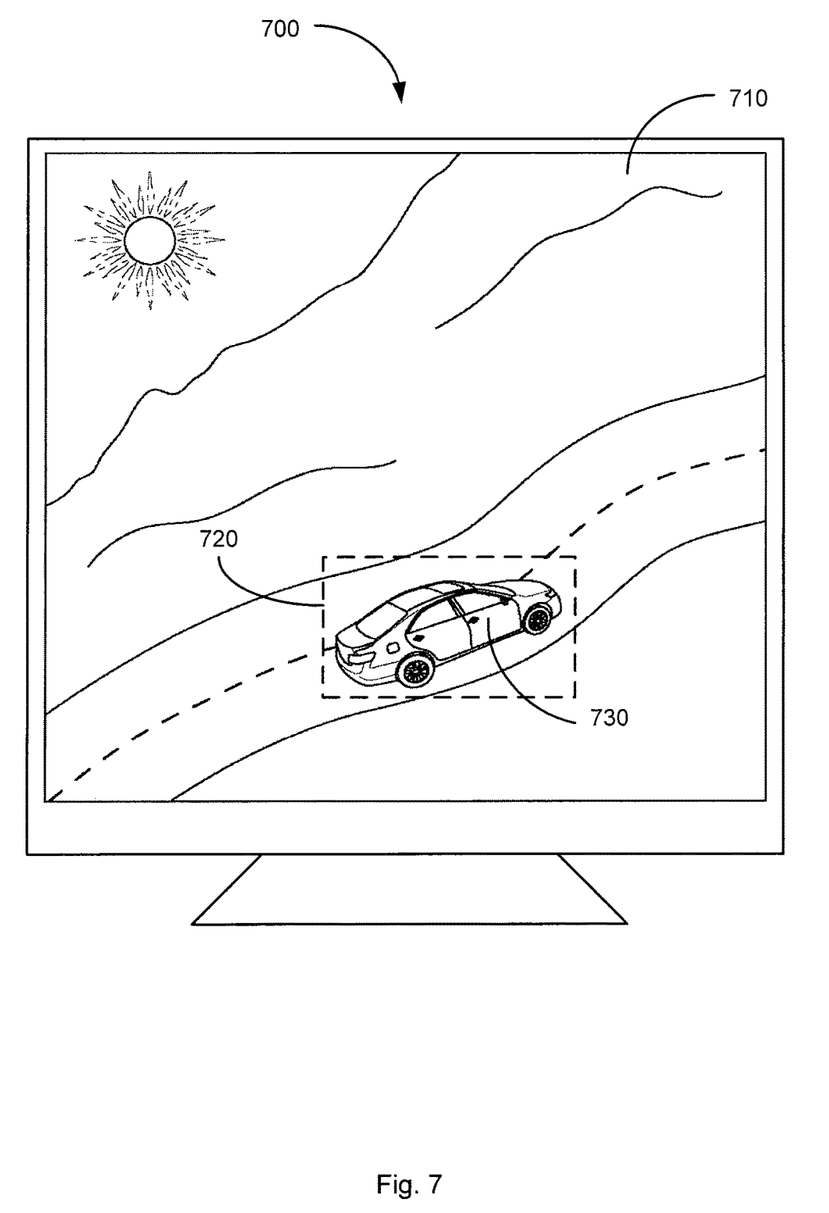
FIG. 7 is a diagram of a display device illustrating a video component of a multimedia presentation and a selected image that may be detected and stored in a searchable database.

Beginning in operation 610, the receiver may receive an image of an object from a frame of a video multimedia presentation. In one embodiment, the user of the receiver may provide the image by highlighting or otherwise indicating on the display device the object to be provided. For example, FIG. 7 is a diagram of a display device 700 illustrating a video component of a multimedia presentation and a selected image 730 that may be detected and stored in a searchable database. In the embodiment shown, the object 730 that is to be added to the searchable database is the car shown in the frame 710. To extract the image 730 from the frame 710, a selector box 720 may be placed around the car 730 by a user of the display device 700. In general, the user may utilize an input device to the receiver or display device 700 to place the box around the car 730. In this manner, the user may indicate or select a portion of the frame 710 that is to be added to the searchable database for future comparisons, as described above. Upon selection, the image within the selector box 720 may be provided to the receiver in operation 610 of FIG. 6.

Once the image is received, the receiver may attempt to determine a keyword or information to associate with the image prior to storage in the database. In this embodiment, the receiver may provide the received image to an image search engine to determine the content of the image. As a result of providing the image to an image search engine, the receiver may receive one or more keywords for the received image in operation 630. In addition, the receiver may receive information related to the image, such as a webpage address or multimedia presentations associated with the image.

In operation 640, the receiver may store the received image and the associated keywords/information in a database. In general, the image and related information may be stored together in the database or may be stored separately. The image and keyword/information may be utilized as described above to detect similar images in the frame of a video component of a multimedia presentation.

Figure 8:
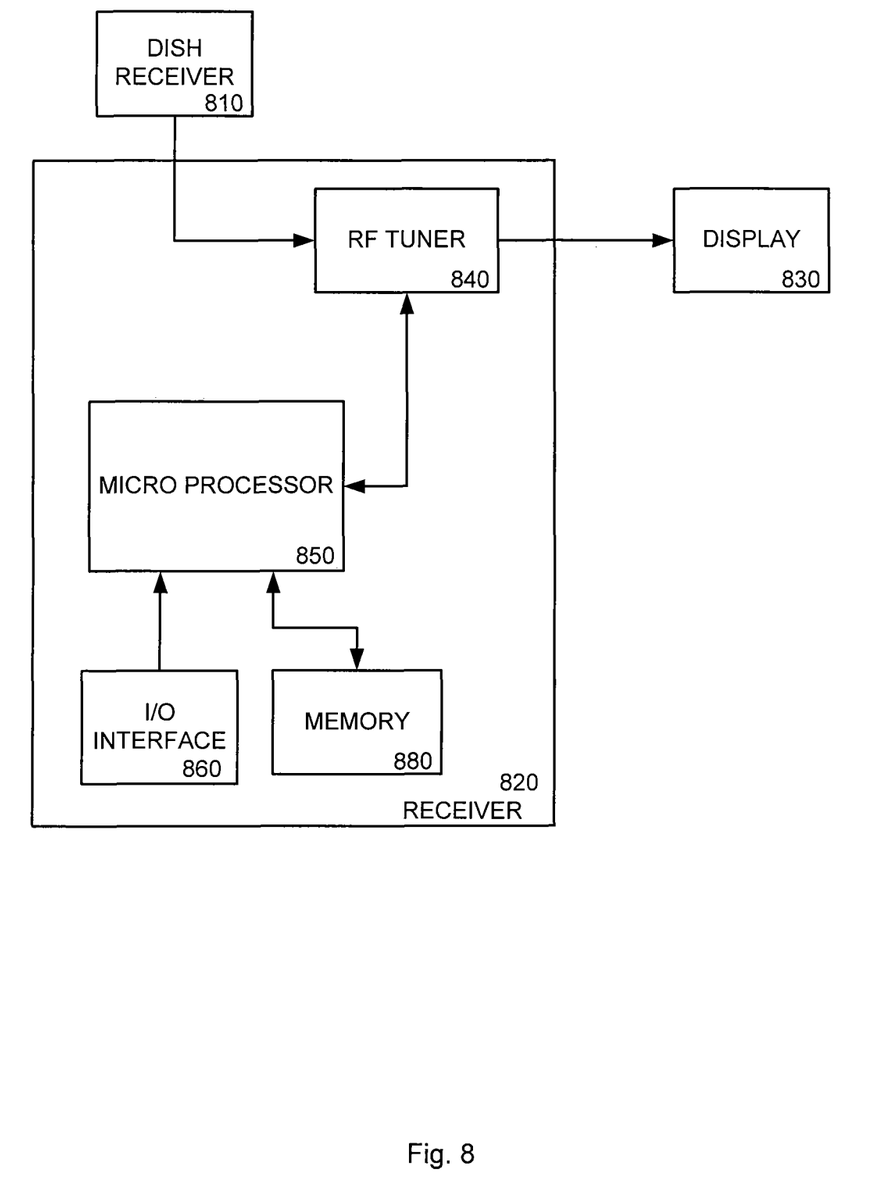
FIG. 8 is a block diagram illustrating an example of a receiver which may be used in implementing embodiments described herein.

FIG. 8 is a block diagram illustrating an example of a receiver 820 which may be used in implementing embodiments described herein. The receiver 820 may receive a transmitted multimedia signal from a satellite dish receiver 810 and may transmit a translated signal to a user's display 830 for display to the user. The multimedia signal may be received at the receiver 820 by a radio frequency (RF) tuner 840. The RF tuner 840 may translate the received signal and provide that signal to the user's display 830. Although not shown, the satellite dish receiver 810 may include a low noise block (LNB) or other components to decrypt and transmit the received multimedia signal. Similarly, the receiver 820 may include more or fewer components as those shown.

Further, the receiver 820 may include a microprocessor 850 coupled to memory 870, as described in more detail below. The receiver may also include an input/output (I/O) interface 860 to interface one or more I/O bridges or I/O devices. I/O devices may also include an input device (not shown), such as an infra-red signal provided by remote control device or alphanumeric input device, including alphanumeric and other keys for communicating information and/or command selections to the microprocessor 850. The I/O device may be utilized by a user to provide inputs and commands to the receiver 820 to control the receiver or display.

System 800 may include a dynamic storage device, referred to as memory 870, or a random access memory (RAM) or other devices coupled to the receiver 820 for storing information and instructions to be executed by the microprocessor 850. Memory 870 also may be used for storing temporary variables or other intermediate information during execution of instructions by the microprocessor 850.

According to one embodiment, the above techniques may be performed by a receiver 820 in response to microprocessor 850 executing one or more sequences of one or more instructions contained in memory 870. These instructions may be read into memory 870 from another machine-readable medium, such as a storage device. Execution of the sequences of instructions contained in memory 870 may cause the microprocessor 850 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as memory 870. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 2 and 6 are illustrative only. Alternative embodiments may add operations, omit operations, or change the order of operations without affecting the spirit or scope of the present invention.

The foregoing merely illustrates certain principles and embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for detecting an image in one or more frames of a video multimedia presentation, the method comprising:
   receiving, at a broadcast multimedia receiver, a broadcast multimedia presentation originating from a broadcast server and broadcast via a network, the broadcast multimedia presentation comprising an audio component and a video component;
   receiving, at the broadcast multimedia receiver, an electronic programming guide (EPG) data block associated with the broadcast multimedia presentation, wherein the EPG data block comprises one or more keywords describing the content of the broadcast multimedia presentation;
   at the broadcast multimedia receiver, determining whether the one or more keywords are associated with a particular category of programming;
   if the broadcast multimedia receiver determines that at least one of the one or more keywords are associated with the particular category of programming, then performing steps (a)-(e) as follows:
   (a) at the broadcast multimedia receiver, selecting a first frame from the video component of the multimedia presentation;
   (b) at the broadcast multimedia receiver, analyzing the first frame for one or more features of an object, wherein the object is a non-textual object and a generic object that is generic to a plurality of different video multimedia presentations;
   (c) at the broadcast multimedia receiver, comparing the one or more features to one or more images stored in a database if the one or more features are present in the first frame, wherein the database only contains images associated with the particular category of programming;
   (d) at the broadcast multimedia receiver, providing the first frame to a display device for display; and
   (e) at the broadcast multimedia receiver, creating an electronic link to access electronic information associated with the object;
   if, however, the broadcast multimedia receiver determines none of the one or more keywords are associated with the particular category of programming, then not performing any of steps (a)-(e).

2. The method of claim 1 further comprising:
   receiving an input from an input device selecting the link; and
   providing the information to the display device for display concurrently with first frame.

3. The method of claim 1 further comprising:
   providing the link to the display device for display.

4. The method of claim 3 further comprising:
   providing a query box to the display device for display, the query box requesting an input from a user to access the information associated with the object.

5. The method of claim 1 further comprising:
   receiving a second frame from the video component of the multimedia presentation; and
   analyzing the second frame for the one or more features of the object.

6. The method of claim 1 further comprising:
   discarding the one or more features if the one or more features do not approximate one of the images stored in the database.

7. The method of claim 1 further comprising:
   determining one or more keywords associated with the object;
   providing the one or more keywords to a search engine through a network connection; and
   receiving a webpage from the search engine including the information about the object.

8. The method of claim 1 further comprising:
   accessing a computer-readable medium through a network connection; and
   obtaining the information from the computer-readable medium.

9. The method of claim 1 further comprising:
   determining one or more keywords associated with the object; and
   searching an electronic program guide for entries that match the one or more keywords, wherein the information comprises at least a listing of one or more multimedia programs associated with the matching entries.

10. The method of claim 1 wherein the database comprises one or more three-dimensional models of objects.

11. A receiver for a distribution system comprising:
    a microprocessor; and
    a computer-readable storage medium, the computer readable storage medium storing a computer-executable code that, when executed by the microprocessor, causes the receiver to perform the operations of:
    receiving a broadcast multimedia presentation originating from a broadcast server and broadcast via a network, the broadcast multimedia presentation comprising an audio component and a video component;
    receiving an electronic programming guide (EPG) data block associated with the broadcast multimedia presentation, wherein the EPG data block comprises one or more keywords describing the content of the broadcast multimedia presentation;
    determining whether the one or more keywords are associated with a particular category of programming;
    if the broadcast multimedia receiver determines that at least one of the one or more keywords are associated with the particular category of programming, then performing steps (a)-(g) as follows:
    (a) selecting a first frame from the video component of the multimedia presentation;
    (b) analyzing the first frame for an object within the first frame, wherein the object comprises one or more features that correspond to one or more features of an object stored in an accessible database such that a comparison of the one or more features determines whether the object is located within the first frame, wherein the database only contains images associated with the particular category of programming, and wherein the object is a non-textual object and a generic object that is generic to a plurality of different video multimedia presentations;
    if the object is not found in the first frame, (c) receiving a second frame from the video component of the multimedia presentation and analyzing the second frame for the object, otherwise;

(d) determining one or more keywords associated with the object;

(e) providing the one or more keywords to a search engine;

(f) receiving electronic information associated with the object from the search engine; and (g) creating an electronic link to access the electronic information associated with the object;

if, however, the broadcast multimedia receiver determines none of the one or more keywords are associated with the particular category of programming, then not performing any of steps (a)-(g).

12. The receiver of claim 11 further comprising:
an input/output interface configured to receive an input from an input device to select the link to access the information associated with the object.

13. The receiver of claim 11 wherein the first frame is stored in the computer-readable storage medium prior to analyzing the first frame for the object.

14. The receiver of claim 11 further comprising:
a display interface, the display interface configured to communicate with the display device and wherein the computer-executable code further causes the receiver to perform the operations:
utilizing the display interface to communicate the first frame; and
providing a query box to the display device for display, the query box requesting an input from a user to access the information associated with the object.

15. The receiver of claim 14 wherein the computer-executable code further causes the receiver to perform the operations:
receiving an input from an input device selecting the link; and
utilizing the display interface to communicate the information associated with the object to the display device for display.

16. The receiver of claim 15 wherein a website and the first frame are displayed concurrently on the display device.

17. A method for detecting a web address in one or more frames of a video multimedia presentation, the method comprising:
receiving, at a broadcast multimedia receiver, a broadcast multimedia presentation originating from a broadcast server and broadcast via a network, the broadcast multimedia presentation comprising an audio component and a video component;
receiving, at the broadcast multimedia receiver, an electronic programming guide (EPG) data block associated with the broadcast multimedia presentation, wherein the EPG data block comprises one or more keywords describing the content of the broadcast multimedia presentation;
at the broadcast multimedia receiver, determining whether the one or more keywords are associated with a particular category of programming;
if the broadcast multimedia receiver determines that at least one of the one or more keywords are associated with the particular category of programming, then performing steps (a)-(f) as follows:

(a) at the broadcast multimedia receiver, selecting a first frame of the video component;

(b) the broadcast multimedia receiver, performing an analysis on the first frame to detect the presence of one or more features of an object within the first frame, wherein the object is a non-textual object and a generic object that is generic to a plurality of different video multimedia presentations;

(c) the broadcast multimedia receiver, comparing the one or more features to one or more images stored in a database, wherein the database only contains images associated with the particular category of programming;

(d) the broadcast multimedia receiver, obtaining a file of electronic information associated with the object if the one or more features approximates one of the one or more stored images;

(e) the broadcast multimedia receiver, creating an electronic link to the electronic information; and (f) the broadcast multimedia receiver, providing a query box to a first display device for display, the query box requesting an input from a user to select the link to access the electronic information associated with the object;

if, however, the broadcast multimedia receiver determines none of the one or more keywords are associated with the particular category of programming, then not performing any of steps (a)-(f).

18. The method of claim 17 further comprising:
storing one or more images in the database comprising:
receiving an image;
providing the image to an image search engine through a network connection;
receiving information associated with the image; and
associating the image with the information in the database.

19. The method of claim 17 further comprising:
receiving an input selecting the link; and
providing the information to the display device for display concurrently with first frame.

20. The method of claim 17 further comprising:
determining one or more keywords associated with the object;
providing the one or more keywords to a search engine through a network connection; and
receiving the information from the search engine.

* * * * *